(12) United States Patent
Dhodapkar

(10) Patent No.: US 7,996,483 B2
(45) Date of Patent: Aug. 9, 2011

(54) ADAPTIVE CACHING IN BROADCAST NETWORKS

(75) Inventor: Amit A. Dhodapkar, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 564 days.

(21) Appl. No.: 11/820,885

(22) Filed: Jun. 20, 2007

(65) Prior Publication Data

US 2008/0320222 A1 Dec. 25, 2008

(51) Int. Cl.
*G06F 15/16* (2006.01)
(52) U.S. Cl. ........ 709/213; 709/217; 709/218; 709/219; 700/118; 700/144; 700/145; 700/167
(58) Field of Classification Search .................. 711/113, 711/118, 144, 145, 167; 709/217, 218, 219, 709/213
See application file for complete search history.

(56) References Cited

U.S. PATENT DOCUMENTS

| | | | |
|---|---|---|---|
| 6,263,402 B1 | 7/2001 | Ronstrom et al. | |
| 6,343,065 B1 | 1/2002 | Serbest et al. | |
| 6,374,404 B1 | 4/2002 | Brotz et al. | |
| 6,651,141 B2* | 11/2003 | Adrangi | 711/118 |
| 6,823,374 B2 | 11/2004 | Kausik et al. | |
| 6,877,066 B2 | 4/2005 | Benfield et al. | |
| 7,349,902 B1* | 3/2008 | Arlitt et al. | 1/1 |
| 7,437,509 B2* | 10/2008 | Vayssiere | 711/118 |
| 2002/0143984 A1 | 10/2002 | Hudson | |
| 2002/0169926 A1* | 11/2002 | Pinckney, III et al. | 711/118 |
| 2003/0208510 A1 | 11/2003 | Doyle et al. | |
| 2004/0049598 A1 | 3/2004 | Tucker et al. | |
| 2004/0068579 A1 | 4/2004 | Marmigere et al. | |
| 2006/0026154 A1 | 2/2006 | Altinelm et al. | |
| 2007/0061450 A1* | 3/2007 | Burnley et al. | 709/224 |
| 2007/0156852 A1* | 7/2007 | Sundarrajan et al. | 709/219 |
| 2007/0162701 A1* | 7/2007 | Schlansker et al. | 711/118 |
| 2008/0098093 A1* | 4/2008 | Simon et al. | 709/219 |

* cited by examiner

*Primary Examiner* — Hong Kim

(57) ABSTRACT

Adaptive caching techniques are described. In an implementation, a head end defines a plurality of cache periods having associated criteria. Request data for content is obtained and utilized to associate the content with the defined cache periods based on a comparison of the request data with the associated criteria. Then, the content is cached at the head end for the associated cache period.

17 Claims, 5 Drawing Sheets

ADAPTIVE CACHING IN BROADCAST NETWORKS

BACKGROUND

A variety of content from content providers may be provided to a plurality of clients via a network operator or head end in addition to television programming, such as web pages and so on. For example, content requested by a client may be specific to a client (e.g., account data) or may be common to multiple clients (e.g., programming data). To minimize requests to the content providers, a head end may cache the content that is common to multiple clients.

For instance, the content provider may make this content available "over the wire" to clients for a time period that has already been requested and provided to a single client. Thus, subsequent clients may obtain the content which is "over the wire" from the cache without another request to, or contacting of, the content provider.

However, since clients may obtain content that is "over the wire" or cached at the head end without a request or contact with the content provider, a head end is not provided with a direct mechanism to gauge how many times particular content is accessed by clients and to optimize the cache by prioritizing which content should be cached and for how long. Consequently, a head end may be limited to using a default time period to cache each requested item of content, which does not correlate the cached content and time period with the most popular content, and does not efficiently use cache space.

SUMMARY

Adaptive caching techniques are described. In an implementation, a head end defines a plurality of cache periods having associated criteria. Request data for content is obtained and utilized to associate the content with the defined cache periods based on a comparison of the request data with the associated criteria. Then, the content is cached at the head end for the associated cache period.

This Summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
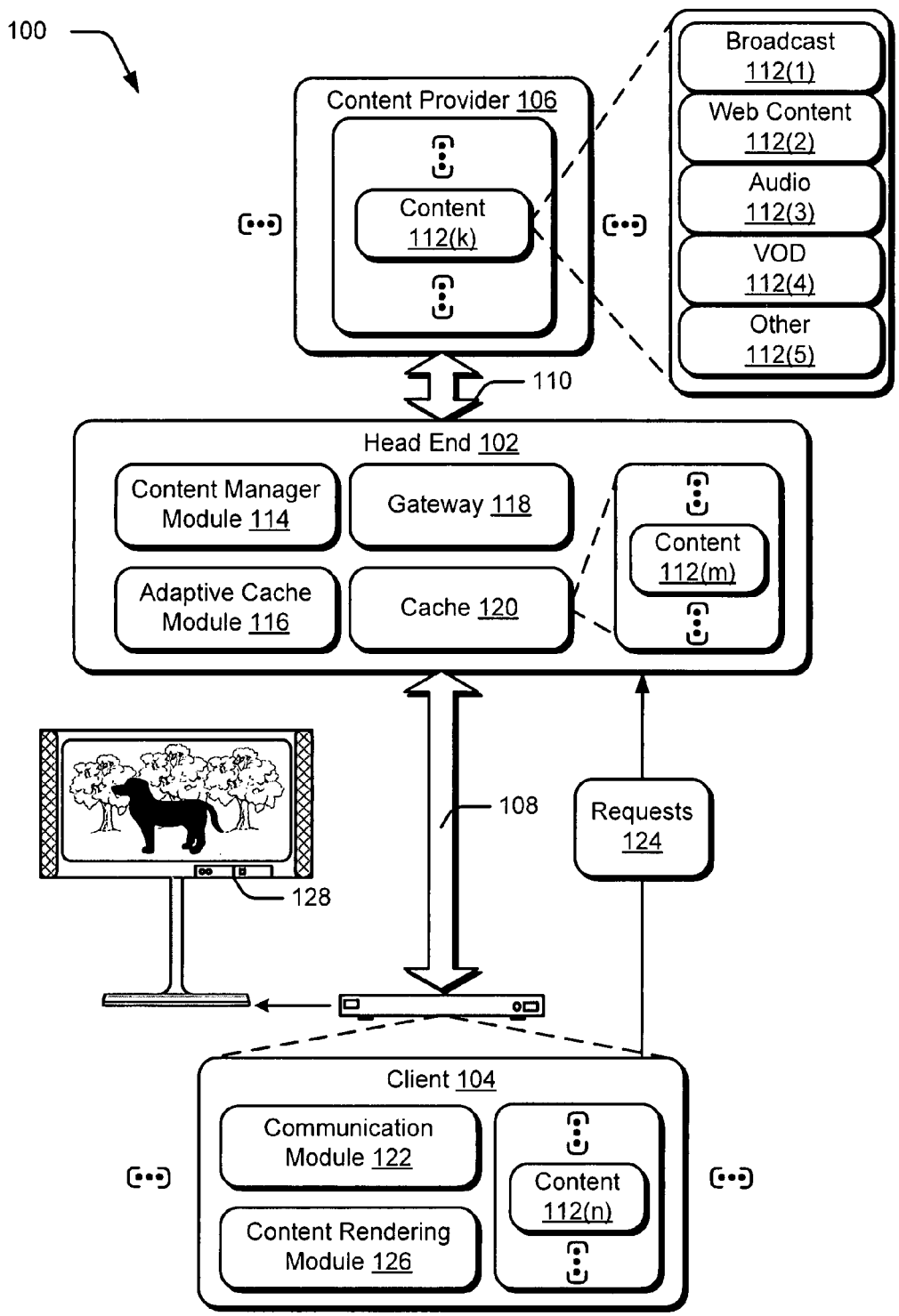
FIG. 1 is an illustration of an environment in an exemplary implementation that is operable to employ adaptive caching techniques.

When content from one or more content providers is "over the wire" (e.g., maintained in a cache in the network, such as at a head end or distribution server) a plurality of clients may access the content without a request to, or contact with, the content provider. Thus, clients may access popular content without overburdening the content providers, head end, and/or network with requests for the content. While this may make client access to the content more efficient, the head end may not know how often content is accessed by the clients. Accordingly, it may be difficult to optimize which content should be cached and for how long based on client access to the content that is "over the wire".

Adaptive caching techniques are described which may be used to optimize a cache of content in the network (e.g., at a head end or distribution server). In an implementation, a head end defines a plurality of cache periods having associated criteria. Request data for content is obtained and utilized to associate the content with the defined cache periods. For example, request data corresponding to particular content may be compared to the criteria to determine a matching cache period. The request data is based on requests which are made by clients when the content is not available "over the wire". The content is then cached at the head end for the associated cache period.

In an implementation, the criteria associated with each of the plurality of cache periods includes a value, or range of values, for either or both of a number of requests made for content and a time interval between requests. The request data is obtained and utilized to determine values for the number of requests and/or interval between requests which correspond to each item of the content. Based on the determined values, each item of content is associated with a cache period having corresponding criteria, e.g., when the values determined based on the request data meet the criteria.

In another implementation, content associated with a cache period may be associated with new cache period based upon subsequent request data for the content. When a client requests the content, the content is cached according to the new cache period. Additional client requests for the content may then cause the cache period to be adjusted again, such that the cache periods and association of the cache periods to content may be adaptively changed as request data related to the content changes over time.

In the following discussion, an exemplary environment is first described that is operable to perform techniques to adaptively cache content from content providers at a head end. Exemplary procedures are then described that may be employed in the exemplary environment, as well as in other environments. Although these techniques are described as employed within a television environment in the following discussion, it should be readily apparent that these techniques may be incorporated within a variety of environments without departing from the spirit and scope thereof.

Exemplary Environment

FIG. 1 is an illustration of an environment 100 in an exemplary implementation that is operable to perform adaptive caching techniques. The illustrated environment 100 includes a head end 102 of a network operator, a client 104 and a content provider 106 that are communicatively coupled, one to another, via network connections 108, 110. In the following discussion, the head end 102, the client 104 and the content provider 106 may be representative of one or more entities, and therefore reference may be made to a single entity (e.g., the client 104) or multiple entities (e.g., the clients 104, the plurality of clients 104, and so on). Additionally, although a plurality of network connections 108, 110 are shown separately, the network connections 108, 110 may be representative of network connections achieved using a single network or multiple networks. For example, network connection 108 may be representative of a broadcast network with back channel communication, an Internet Protocol (IP) network, and so on.

The client 104 may be configured in a variety of ways. For example, the client 104 may be configured as a computer that is capable of communicating over the network connection 108, such as a desktop computer, a mobile station, an entertainment appliance, a set-top box communicatively coupled to a display device as illustrated, a wireless phone, and so forth. For purposes of the following discussion, the client 104 may also relate to a person and/or entity that operate the client. In other words, client 104 may describe a logical client that includes a user, software, and/or a machine.

The content provider 106 includes one or more items of content 112(k), where "k" can be any integer from one to "K". The content 112(k) may include a variety of data, such as broadcast 112(1) programming (e.g., television) and web content 112(2) examples of which include browser pages, streaming audio and/or video, really simple syndication (RSS) and/or other feeds, podcasts and other webcasts, images, web-based applications, e-mail, instant messaging, voice over internet protocol (VoIP) and other Internet services. Additional examples of content 112(k) are also depicted including audio 112(3) files; video-on-demand (VOD) 112(4) files; and various other 112(5) content available from a content provider 106, a few examples of which include gaming content, electronic programming guide (EPG) data, client applications and/or updates, and so forth. The content 112(k) is communicated over the network connection 110 to the head end 102.

The head end 102 is illustrated as including a content manager module 114. The head end 102 is also illustrated as including an adaptive cache module 116, a gateway 118, and a cache 120. The content manager module 114 is representative of functionality to manage and configure content at the head end 102, to process requests for content, manage interactions of the head end 102 with clients 104 and content providers 106, and so forth.

For instance, content manager module 114 may interact with a content provider 106 to obtain content 112(k) which is communicated via the network connection 110 and is received by the head end 102. The content 112(k) may be stored (e.g., cached) as one or more items of content 112(m) where "m" can be any integer from one to "M". For instance, content 112(m) is illustrated in FIG. 1 as being stored in the cache 120 at the head end 102. Content 112(m) which is maintained in the cache 120 may be referred to as being "over the wire". Content 112(m) which is "over the wire" may be accessed by multiple clients 104 without additional requests or interaction of the head end 102 or clients 104 with the content provider 106. Content 112(m) may be cached in the cache 120 for a certain time period, at which point the content 112(m) expires and may be removed from the cache 120.

The adaptive cache module 116 is representative of a variety of functionality to optimize the cache 120 of head end 102. While illustrated separately, adaptive cache module 116 may alternatively be implemented as a component of the content manager module 114. In operation, the adaptive cache module 116 may process request data associated with content 112(k) and utilize the request data to determine which content 112(k) from content providers 106 should be maintained in the cache 120 and for how long the content 112(k) should be maintained. The gateway 118 is representative of functionality to provide the clients 104 interactions with respect to certain content providers 106 and associated content 112(k). For example, the gateway 118 may be configured to provide a communication pathway to one or more web servers providing web content 112(2). Thus, the gateway 118 may act as an intermediary between clients 104 and web servers to obtain web content 112(2) which may be provided as packetized computer data over the network connections 108, 110 or other suitable connections. While a gateway 118 to provide access to web content 112(2) is described, a gateway 118 may alternatively be configured to provide access to a variety of other types of content 112(k). Further discussion of functionality which may be provided by adaptive cache module 116 and gateway 118 may be found in relation to FIGS. 2-3.

The content 112(m) cached at head end 102 may be the same as or different from the content 112(k) received from the content provider 106. The content 112(m), for instance, may include additional data for broadcast to the client 104. For example, the content 112(m) may include electronic program guide (EPG) data from an EPG database for broadcast to the client 104. For example, the EPG data may broadcast repeatedly to the client 104, such as by utilizing a carousel file system. In an implementation, the carousel file system may be used to repeatedly broadcast the EPG data over an out-of-band (OOB) channel to the client 104 over the network connection 108. A variety of other broadcast techniques are contemplated to provide EPG data to a client via connection 108. Distribution from the head end 102 to the client 104 may be accommodated in a number of ways, including cable, radio frequency (RF), microwave, digital subscriber line (DSL), and satellite.

The content manager module 114 may also be representative of functionality to configure content 112(m) for output (e.g., streaming) over the network connection 108 to the client 104. The content manager module 114, for instance, may configure content 112(k) received from the content provider 106 to be suitable for transmission over the network connection 108, such as to "packetize" the content for distribution over the Internet, configuration for a particular broadcast channel, map the content 112(k) to particular channels, and so on. Content manager module 114 may also operate to process requests for content 112(k) from content providers 106.

The client 104, as previously stated, may be configured in a variety of ways to receive the content 112(m) over the network connection 108. In an embodiment, the client 104 may include digital video recorder (DVR) functionality. For instance, the client 104 may include a storage to record content 112(m) as content 112(n) (where "n" can be any integer from one to "N") received via the network connection 108 for output to and rendering by the display device. The storage may be configured in a variety of ways, such as a hard disk drive, a removable computer-readable medium (e.g., a writable digital video disc), and so on. Thus, content 112(n) that is stored in the storage of the client 104 may be copies of the content 112(m) that was streamed from the head end 102. Additionally, content 112(n) may be obtained from a variety of other sources, such as from a computer-readable medium that is accessed by the client 104, and so on.

The client 104 includes a communication module 122 that is executable on the client 104 to control content playback on the client 104, such as through the use of one or more "command modes", i.e., "trick modes". The command modes may provide non-linear playback of the content 112(n) (i.e., time shift the playback of the content 112(n)) such as pause, rewind, fast forward, slow motion playback, and the like. The communication module 122 may be configured to interact with the head end 102 to obtain a variety of content 112(m), further discussion of which may be found in relation to FIG. 2.

The one or more clients 104 as illustrated in FIG. 1 may provide a plurality of requests 124 for content to the head end 102. Requests 124 may be communicated via the connection 108 or other suitable communication pathways. The content manager module 114 may operate to process these requests 124 and provide corresponding content 112(k) from the content providers 106 to the clients 104. In an implementation, different types of requests 124 may be processed and/or routed via different associated components of the head end 102. For example, processing of requests 124 for web content 112(2) may occur directly or indirectly via a corresponding gateway 118, while content manager module 114 processes other requests 124, such as for broadcast content 112(1). Further, the adaptive cache module 116 may be executed to monitor the requests 124 and to use the requests 124 as a basis to determine which content 112(k) should be cached in cache 120, and to associate a time period with the content 112(k) specifying how long to cache the content 112(k).

The client 104 typically includes hardware and software to transport and decrypt content 112(m) received from the head end 102 for rendering at the client 104. For instance, the client 104 of FIG. 1 is illustrated as including a content rendering module 126. While illustrated separately, the content rendering module may alternatively be implemented as a component of the communication module 122. The content rendering module 126 is representative of functionality to render content 112(m), 112(n) for output. The output, by way of example, may be via the illustrated display device 128. Although a display device 128 is shown, a variety of other output devices are also contemplated, such as speakers.

Thus, in the environment 100 of FIG. 1, the content provider 106 may broadcast the content 112(k) over a network connection 110 to a multiplicity of network operators, an example of which is illustrated as head end 102. The head end 102 may then stream the content 112(m) over a network connection to a multitude of clients, an example of which is illustrated as client 104. The client 104 may then store the content 112(m) in the storage as content 112(n) and/or render the content 112(m) immediately for output as it is received, such as when the client 104 is configured to include digital video recorder (DVR) functionality.

The content 112(m) in cache 120 at head end 102 may also be representative of time-shifted content, such as video-on-demand (VOD) 112(4) content that is streamed to the client 104 when requested, such as movies, sporting events, and so on. For example, the head end 102 may execute the content manager module 114 to provide a VOD system such that the content provider 106 supplies content 112(k) in the form of complete content files to the head end 102. The head end 102 may then store the content 112(k) as content 112(m). The client 104 may then request playback of desired content 112(k) by contacting the head end 102 (e.g., a VOD server) and requesting a feed of the desired content.

It should be noted that one or more of the entities shown in FIG. 1 may be further divided (e.g., the functionality of head end 102 may be implemented by a plurality of servers in a distributed computing system, such as providing content manager module 114 and gateway 118 via separate servers), combined (e.g., the adaptive cache module 116 may be implemented as a component of the gateway 118), and so on and thus the environment 100 of FIG. 1 is illustrative of one of a plurality of different environments that may employ the described techniques.

Figure 2:
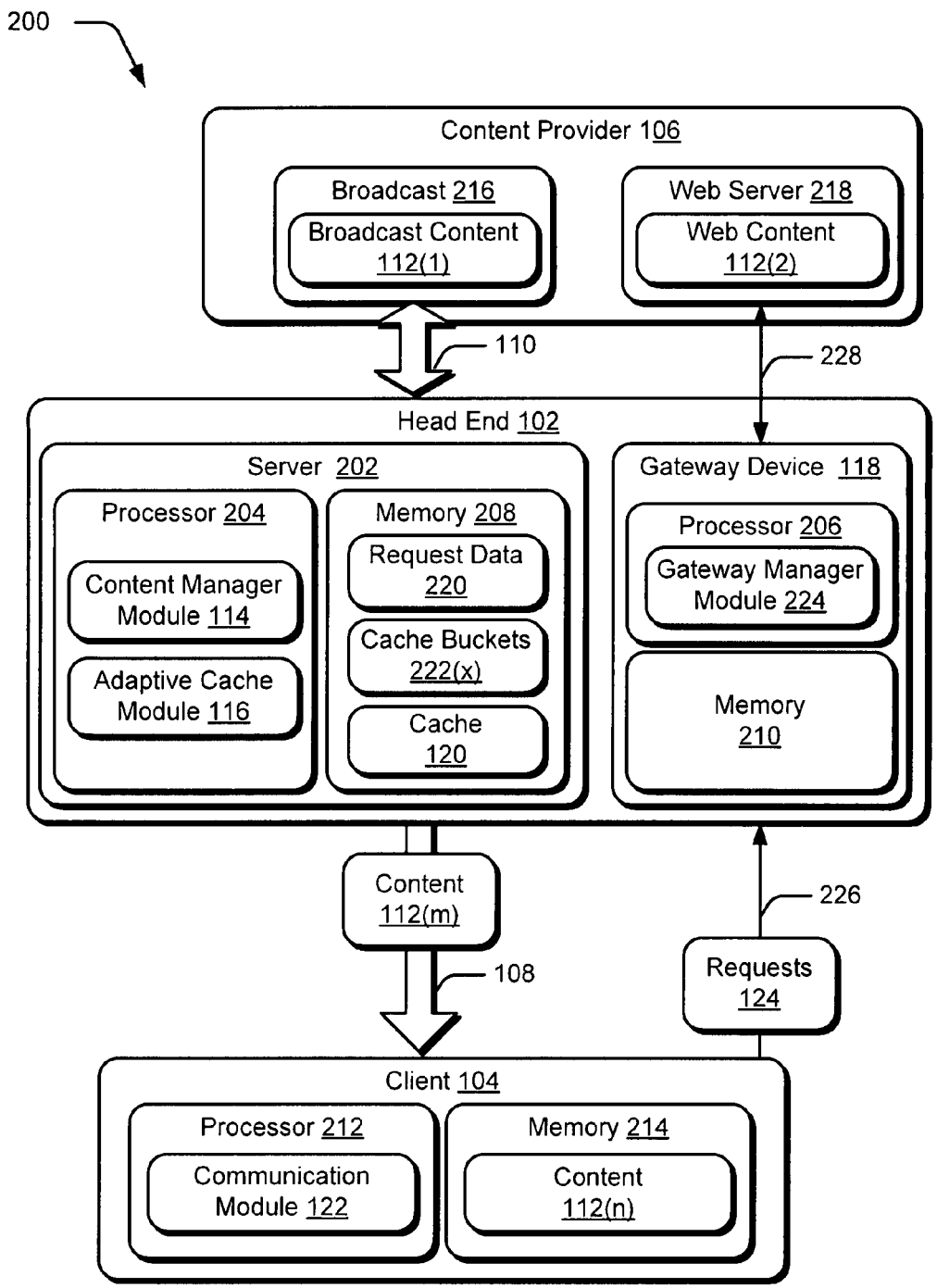
FIG. 2 is an illustration of a system showing a content provider, a head end and a client of FIG. 1 in greater detail.

FIG. 2 depicts a system 200 in an exemplary implementation showing the head end 102 and the client 104 in greater detail. The head end 102 is illustrated as implemented via one or more devices which in the illustrated example includes a server 202 and a gateway 118 device. While illustrated in FIG. 2 as a separate server, the gateway 118 device may alternatively be implemented as a component of server 202. Further, while a single server 202 is depicted, the functionality of the head end 102 may be implemented via multiple servers, e.g., a server farm.

The server 202 and gateway 118 device are each illustrated as having respective processors 204, 206 and memory 208, 210. The client 104 is illustrated as a client device and also includes a respective processor 212 and memory 214. Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Additionally, although a single memory 208, 210, 214 is shown, respectively, for the server 202, gateway 118, and the client 104, a wide variety of types and combinations of memory may be employed, such as random access memory (RAM), hard disk memory, removable medium memory, and other types of computer-readable media.

The content providers 106 are illustrated as including a broadcast 216 provider providing broadcast content 112(1) and a web server 218 providing web content 112(2). A variety of other content providers 106 and associated content 112(k) are also contemplated.

Processor 204 of the server 202 at head end 102 is depicted as executing the content manager module 114 and adaptive cache module 116 to provide content 112(n) to the client 104, obtain and manage content 112(k) from content providers 106, optimize content 112(m) maintained in cache 120 and so forth. The content manager module 114 and adaptive cache module 116 are also storable in memory 208 or other suitable storage.

As noted, adaptive cache module 116 may be provided as a standalone module, as a component of content manager module 114, a component of gateway 118, and so forth. In operation, the adaptive cache module 116 may obtain request data 220 corresponding to requests 124 from clients 104 for content 112(k) of FIG. 1 from the content providers 106. A variety of request data 220 is illustrated as stored in memory 208. Request data 220 for example may be associated with each item of content 112(k) and may indicate a number of requests 124 made for the content 112(k), how often the content 112(k) is requested, which clients 104 or groups of clients 104 request the content 112(k), demographic data, and/or other data corresponding to the requests 124 and the clients 104 making the requests 124.

The request data 220 may be provided from the content manager module 114 based on requests 124 received at the head end 102. Additionally or alternatively, adaptive cache module 116 may monitor requests 124 received at the head end 102 and produce request data 220 based on the monitoring. Request data 220 may then be stored in memory 208, processed, and/or used by the adaptive cache module 116 to determine which content 112(k) should be placed in cache 120 and/or for how long the content 112(k) is to be maintained in the cache 120. Request data 220 in memory 208 may represent a database which may be maintained at the head end 102, and may be configured in a variety of ways to allow access, updating, and manipulation of associated request data 220.

Adaptive cache module 116 may also define and implement different cache periods and associate the cache periods with different content 112(k) to designate an amount of time to cache the content 112(k). Thus, adaptive cache module 116 may be used to enact and enforce a defined cache scheme or policy to optimize the cache 120. A variety of techniques to associate different cache periods with different content 112(k) are contemplated.

In an exemplary technique, cache periods are associated with content 112(k) via a variety of cache buckets 222(k) each having a corresponding cache period. Content 112(k) assigned to a particular cache bucket 222(k), is cached (e.g., maintained "over the wire") for the corresponding cache period. Adaptive cache module 116 also represents functionality to define and/or maintain a variety of cache buckets 222(x) where x may be any integer from one to "X". The cache buckets 222(x) represent a plurality of categories which may be defined and to which items of content 112(k) may be assigned to categorize the content 112(k) and to logically associate different content 112(k) with different cache periods.

Generally, content 112(k) is assigned to different categories or cache buckets 112(k) based on the priority and/or popularity of the content 112(k), e.g., how often it is requested, when it is requested, which of the clients 104 request, and so forth. While categorization via cache buckets 222(x) is described, it is contemplated that the adaptive cache techniques herein may be implemented using a wide range of categorization techniques without departing from the spirit and scope thereof.

Each of the cache buckets 222(x) may include various criteria used by the adaptive cache module 116 to determine which content 112(k) to assign to various content buckets 222(x). For instance, adaptive cache module 116 obtains request data 220 for particular content 112(k) which is requested by a client 104. The adaptive cache module 116 may compare request data 220 corresponding to the particular content 112(k) to criteria defined for the cache buckets 222(x) and assign the particular content 112(k) to a corresponding one of the cache buckets 222(x). Further discussion of cache periods may be found in relation to FIG. 3.

As noted, a gateway 118 may be included at the head end 102 to provide a communication pathway between clients 104 and particular content 112(k). In the illustrated example, the gateway 118 is depicted as an Internet gateway to provide clients 104 access to web content 112(2) from one or more web servers 218.

A gateway manager module 224 is illustrated as executing via processor 206 of the gateway 118. The gateway 118 is further illustrated as providing connections 226, 228 between the client 104 and web server 218. Thus, the gateway 118 may provide a distinct communication pathway between a client 104 and web server 218 which is separate from the connections 108, 110. The connections 226, 228 may represent a back channel data network, an Internet protocol (IP) network, and so on.

The gateway manager module 224 represents functionality to manage the connections 226, 228 and client access to web content 112(2), process requests 124 for web content 112(2), obtain web content 112(2), and so forth. Gateway manager module 224 may also interact with adaptive cache module 116 to provide adaptive caching techniques for requested web content 112(2).

Requests 124 in this example may include requests 124 for web content 112(2) which are processed by the gateway manager module 224. Requests 124 for web content 112(2) may be received and processed directly via the gateway manager module 224 Alternatively, requests 124 for web content 112(2) may be processed indirectly, such as by having content manager module 114 receive requests 124 and route those that are for web content 112(2) to the gateway 118 for processing by the gateway manager module 124. In an implementation, the adaptive cache module 116 may be provided as a component of the gateway manager module 224, in addition to or in lieu of the adaptive cache module 116 depicted as provided with server 202. Thus, adaptive caching techniques for various content 112(k) may be provided by one common adaptive cache module 116, or alternatively via multiple modules performing adaptive cache functionality for different content 112(k) accessed via different components and pathways.

Content 112(m) in the system 200 of FIG. 2 is illustrated as being streamed by the head end 102 to the client 104, such as through execution of the content manager module 114. Communication module 122, which is depicted as executing on the processor 212 at client 104, may be configured in a variety of ways to receive, process, and output the content 112(m). For instance, communication module 122 may be configured to operate as a tuner to receive broadcast content, communicate via an internet protocol (IP) network, incorporate browser functionality to interact with web pages, and so on. In an implementation, the communication module 122 is configured to receive broadcast content 112(1) over network connections that are different than those used to receive web content 112(2), such as to receive broadcast content 112(1) via a broadcast network, e.g., connections 108, 110 and web content 112(2) via an IP network using the gateway 118 device, e.g., via connections 226, 228. Alternatively, the connections 108, 110 and 226, 228 may represent connections within the same network through which both broadcast content 112(1) and web content 112(2) may be received. A variety of other examples are also contemplated.

The content 112(m) streamed to the client 104 may then be rendered by the communication module 122 for output, such as through use of the content rendering module 126 as previously described. For example, rendering of the content 112(m) may include processing of the content 112(m) to be suitable for output, such as "drawing" of images from a file into a visual form on the display device 128 of FIG. 1; converting an audio file into audio suitable for output via speakers on the display device; combining of broadcast content 112(1), web content 112(2), and/or other types of content 112(m) such as through overlays and/or different graphical interfaces portions; and so on. Thus, an output provided by communication module 122 via content rendering module 126 may display, concurrently or at different times, broadcast content 112(1), web content 112(2), and other content 112(k), which is arranged in common areas or in separate areas of a display device 128. Thus, as an illustrative example the client may watch a broadcast television program, access interactive web pages related to the program, and/or access web content 112(2) such as email via the communication module 122, at different times, at the same time, in the same or different user interfaces, and so forth.

Figure 3:
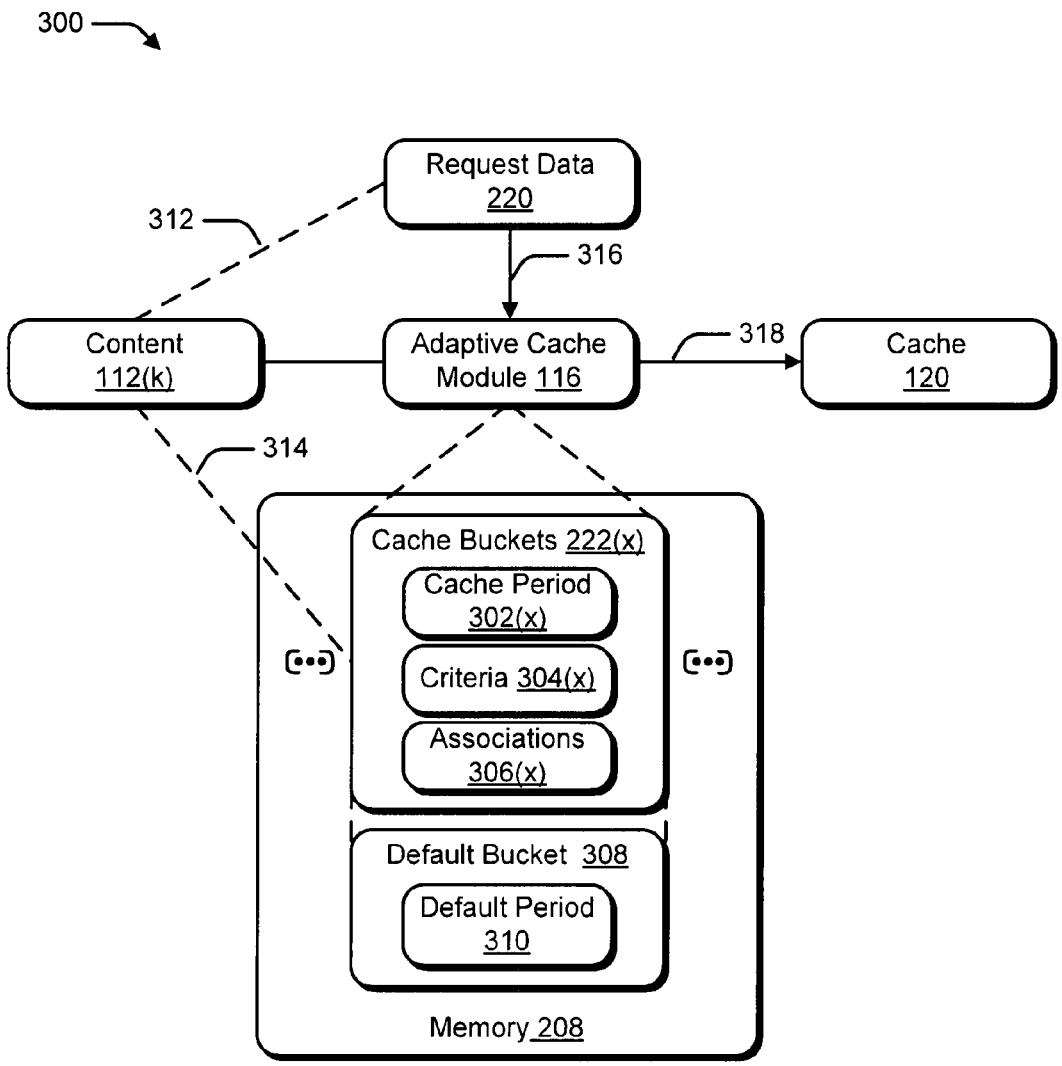
FIG. 3 is an illustration of an exemplary implementation of cache buckets which may be used to assign cache periods to content.

FIG. 3 depicts an exemplary implementation 300 of cache buckets 222(x) of FIG. 2 which may be used to assign cache periods to content. The cache buckets 222(x) are illustrated as being provided in a portion of a head end, such as the head end 102 of FIG. 2 and show aspects of the cache buckets 222(x) in greater detail.

An adaptive cache module 116 is illustrated as providing one or more cache buckets 222(x). For example, the cache buckets 222(x) may be defined and/or maintained in memory 208 of head end 102 via the adaptive cache module 116 as illustrated. Alternatively, the cache buckets 222(x) may be defined and/or maintained in other suitable storage, such as memory 210 of gateway 118, in storage separate from the head end 102, and so on.

Adaptive cache module 116 may define the cache buckets 222(x), which are then utilized to associate content 112(k) with a variety of different corresponding cache periods 302(x). For instance, each of the cache buckets 222(x) of FIG. 3 is illustrated as including a respective cache period 302(x); associated criteria 304(x); and associations 306(x), which relate the plurality of cache buckets 222(x) to content 112(k). In the discussion herein, the cache buckets 222(x), cache periods 302(x), criteria 304(x), and associations 306(x) may be representative of one or more entities, and therefore reference may be made to a single entity (e.g., a cache period 302(x)) or multiple entities (e.g., cache periods 302(x), the plurality of cache periods 302(x), and so on).

A wide range of cache periods 302(x) may be defined to adaptively cache content 112(k). For instance, cache periods 302(x) may be a number of seconds, minutes, hours, or even days. To optimize use of the cache 120, content 112(k) which is requested relatively often may be assigned a longer cache period 302(x) than content which is rarely requested. Typically, content 112(k) is cached for the associated cache period 302(x) and then is "flushed" or deleted from the cache 120 when the cache period 302(x) expires to make room for different content 112(k).

As noted content 112(k) is generally assigned to different categories or cache buckets 112(k) based on the priority and/or popularity of the content 112(k). Assigning cache periods 302(x) to content 112(k) represents one exemplary technique to manage a cache 120 based on priority and/or popularity. In another example, priority and/or popularity of content 112(k) may be used directly to determine which content 112(k) to keep and which content to remove from cache 120. In this example, cache periods 302(x) may or may not be assigned to the content 112(k). For instance, priority and/or popularity may be measured based upon the number of requests 124 made for content 112(k). Cache module 116 as noted may process request data 222 to determine priority and/or popularity for content 112(k). Then, content 112(k) that is requested relatively infrequently may be removed from cache 120 before content 112(k) which is requested more frequently, to make way for new content 112(k) in the cache 120. If different content 112(k) is equally popular, then content 112(k) that has been in the cache 120 the longest may be removed first. In this implementation, content 112(k) may be removed from cache 120 based on priority and/or popularity, before an assigned cache period 302(x) expires or without assigning of cache periods.

In an implementation in which cache periods 302(x) are employed, the defined cache periods 302(x) as well as the assignments of the cache periods 302(x) are continually updated as new request data 220 is obtained and processed by the head end 102 and/or adaptive cache module 116. Thus, content 112(k) may be assigned and reassigned to cache periods 302(x) in an adaptive manner as corresponding request data 220 for the content 112(k) changes over time. Further, additional cache periods 302(x) and/or cache buckets 222(x) may be defined, based on the request data 220 obtained and stored at the head end 102.

For example, one of cache buckets 222(x) may be redefined, and/or split into two or more cache buckets 222(x) when the one cache bucket 222(x) is "full", e.g., when a threshold value set for the amount of content which may be included in the cache bucket 222(x) is met or exceeded. The threshold value may define a number of different items of content 112(k) which may be associated with a cache bucket 222(x), the number of associations 306(x) which may be made for a cache bucket 222(x), a capacity or storage size of the cache bucket 222(x) such as a maximum number of bytes, and so on. A variety of other examples are also contemplated. When a cache bucket 222(x) is split, the resultant cache buckets 222(x) may be defined having different respective criteria 304(x) and different associated cache periods 302(x). Adaptive cache module 116 may be configured with logic to determine when and how to redefine cache periods 302(x) and/or cache buckets 222(x) based on request data 220 and corresponding associations 306(x). Thus, a variety of cache buckets 222(x) may be formed to optimize usage of a cache 120 by splitting other cache buckets 222(x).

The criteria 304(x) associated with cache buckets 222(x) are used to match content 112(k) to the cache buckets 222(x). For example, request data 220 may include a variety of parameters which may be compared to the criteria 304(x) to determine with which of the cache buckets 222(x) an item of content 112(k) should be associated. When content 112(k) meets the criteria 304(x), then an association 306(x) is formed between the content 112(k) and the cache buckets 222(x). Adaptive cache module 116 may be configured with logic to compare request data 220 for content 112(k) to the criteria 304(x) and based on the comparison, associate content 112(k) with a corresponding one of the cache buckets 222(x).

A variety of criteria 304(x) is contemplated, which may be used alone or in combinations thereof. In an implementation, the criteria 304(x) include a time interval, or range of time intervals, based on requests 124 made for content 112(k). Request data 220 may be used by the adaptive cache module 116 to determine a corresponding time interval for associated content 112(k). The time interval may reflect a time value derived from a plurality of requests 124 for content 112(k), such as the most recent interval between requests, a maximum interval, a minimum interval, an average interval between requests, and so forth. The interval may alternatively be defined as the time between when the content 112(k) is removed from the cache 120 and when the next request 124 for the content 112(k) is made.

It is noted that the requests 124 and associated request data 220 are based on requests 124 for content 112(k) which are made to the content providers 106. These requests 124 occur when content 112(k) is not "over the wire" or cached at the head end 102. Since clients 104 may access content 112(k) which is "over the wire" without making a request 124, the actual number of times clients 104 access the content 112(k) may not be available. Thus, in an embodiment, the time interval between requests 124 made by clients 104 is used as an approximation for how often clients 104 access content 112(k), e.g., the popularity of the content 112(k). Examples of intervals between requests which may be defined in the criteria 304(x) include an average interval of less than 1 hour; an average interval between 0 and 30 minutes; a last interval between 20 minutes and 40 minutes; a maximum interval of 24 hours; and so on.

The criteria 304(x) may also include a total number of requests for an item of content 112(k). The total number may be configured as a threshold value such as greater than 1000 total requests, a range such as between 500 and 1500 total requests, and so forth. Request data 220 may be used by the adaptive cache module 116 to determine the total number of requests made for associated content 112(k). For example, adaptive cache module 116 may be configured to track the number of requests 124 over time, such as by maintaining counters for each item of content 112(k), processing of request data 220 on demand or at scheduled times, and so forth.

In an implementation, both the time interval between requests 124 and the total number of requests 124 may be used, alone or in combination, in defining the plurality of cache buckets 222(x). For example, one of the cache buckets 222(x) may define a 30 minute cache period 302(x) for content 112(k) having an interval of less than 1 hour. Another one of the cache buckets 222(x) may define a 45 minute cache period 302(x) for content 112(k) having more than 1000 total requests 124. Combinations of criteria 304(x) are also contemplated, such as a cache bucket 222(x) having a 30 minute cache period 302(x) for content 112(k) having a maximum interval of less than 1 hour and less than 1000 total requests 124, and another cache bucket 222(x) specifying a cache period 302(x) of 60 minutes for content 112(k) having an average interval between 30 minutes and 1 hour and more than 3000 total requests 124. A variety of other examples are also contemplated.

A variety of other types of criteria 304(x) may also be specified to further define the cache buckets 222(x). Such criteria may include, but is not limited to: a number of requests 124 made within in a specified time period, such as the average number of request per hour, per week, or per day; content categories such as the type (e.g., audio, video, broadcast, web, or other types) or genre (e.g., movie, sports, comedy, drama, or other genres); demographic or profile data regarding the requesting clients 104; data regarding the content provider 106; and so forth. Thus, a variety of criteria 304(x) is contemplated which may be used, alone or in combinations, to define cache buckets 222(x) to adaptively cache content 112(k).

FIG. 3 further depicts a default bucket 308 which may be provided via the adaptive cache module 116 and which has an associated default period 310. Thus, content 112(k) which is not assigned to a cache bucket 222(x), such as initially requested content 112(k), may be assigned to the default bucket 308 and cached for the default period 310. When additional requests 124 for the content 112(k) are received, processing of associated request data 220 may cause an association 306(x) of the content 112(k) with a cache bucket 222(x) to be made, and accordingly replacement of the default period 310 with a corresponding cache period 302(x).

In operation, content 112(k) which is requested by clients 104 and provided via the head end 102 may be cached at the head end 102, or other suitable storage location. The content 112(k) is cached according to different cache periods 302(x) which are assigned to and/or associated with the content 112(k). The associations 306(x) represent the assignment of content 112(k) to the various cache buckets 222(x) which may be performed based on request data 220 obtained and processed by the adaptive cache module 116.

For instance, FIG. 3 further depicts an exemplary item of content 112(k) which may be encountered by the head end 102, content manager module 114, gateway 118, and/or adaptive cache module 116. The item of content 112(k) has corresponding request data 220 as represented by the dashed line 312. The item of content 112 may also be associated with one of a plurality of cache buckets 222(x) as represented by the dashed line 314, such as through operation of the adaptive cache module 116.

For instance, the adaptive cache module 116 may be executed such as via the processor 204 of FIG. 2 to obtain and/or process request data 220 associated with the content 112(k) as represented by the arrow 316. Based on the request data 220, an association 306(x) between the content 112(k) and a corresponding bucket 222(x) may be formed and/or determined. In particular, the request data 220 may be used to determine if the criteria 304(x) for any of the cache buckets 222(x) has been met. Then, associations 306(x) may be formed.

The adaptive cache module 116 may then operate to cache the content 112(k) in the cache 120 as represented by the arrow 318 for a cache period 302(x). In particular, adaptive cache module 116 caches the content 112(k) in the cache 120 according to the cache period 302(x) of a cache bucket 222(x) with which the content 112(k) has been associated, or the default period 310 when no association 306(x) is formed or determined.

It should be noted that the described cache buckets 222(x) are but one example of a variety of contemplated techniques by which different cache periods 302(x) may be assigned to different content 112(k) at a head end 102. For example, rather than using cache buckets 222(x), data such as the cache periods 302(x) or an identifier may be inserted directly into items of content 112(k) based on request data 220 to designate a cache period 302(x) for the content 112(k). Adaptive cache module 116 may then reference the inserted data to perform adaptive caching techniques. A variety of other examples are also contemplated. Further discussion of adaptive cache techniques may be found in relation to the following exemplary procedures.

Generally, any of the functions described herein can be implemented using software, firmware, hardware (e.g., fixed-logic circuitry), manual processing, or a combination of these implementations. The terms "module", "functionality" and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer-readable memory devices. The features of the adaptive caching techniques described herein are platform-independent, meaning that the techniques may be implemented on a variety of commercial computing platforms having a variety of processors.

Exemplary Procedures

The following discussion describes adaptive caching techniques that may be implemented utilizing the previously described environment, systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 the system 200 of FIG. 2 and/or the cache buckets 300 of FIG. 3.

Figure 4:
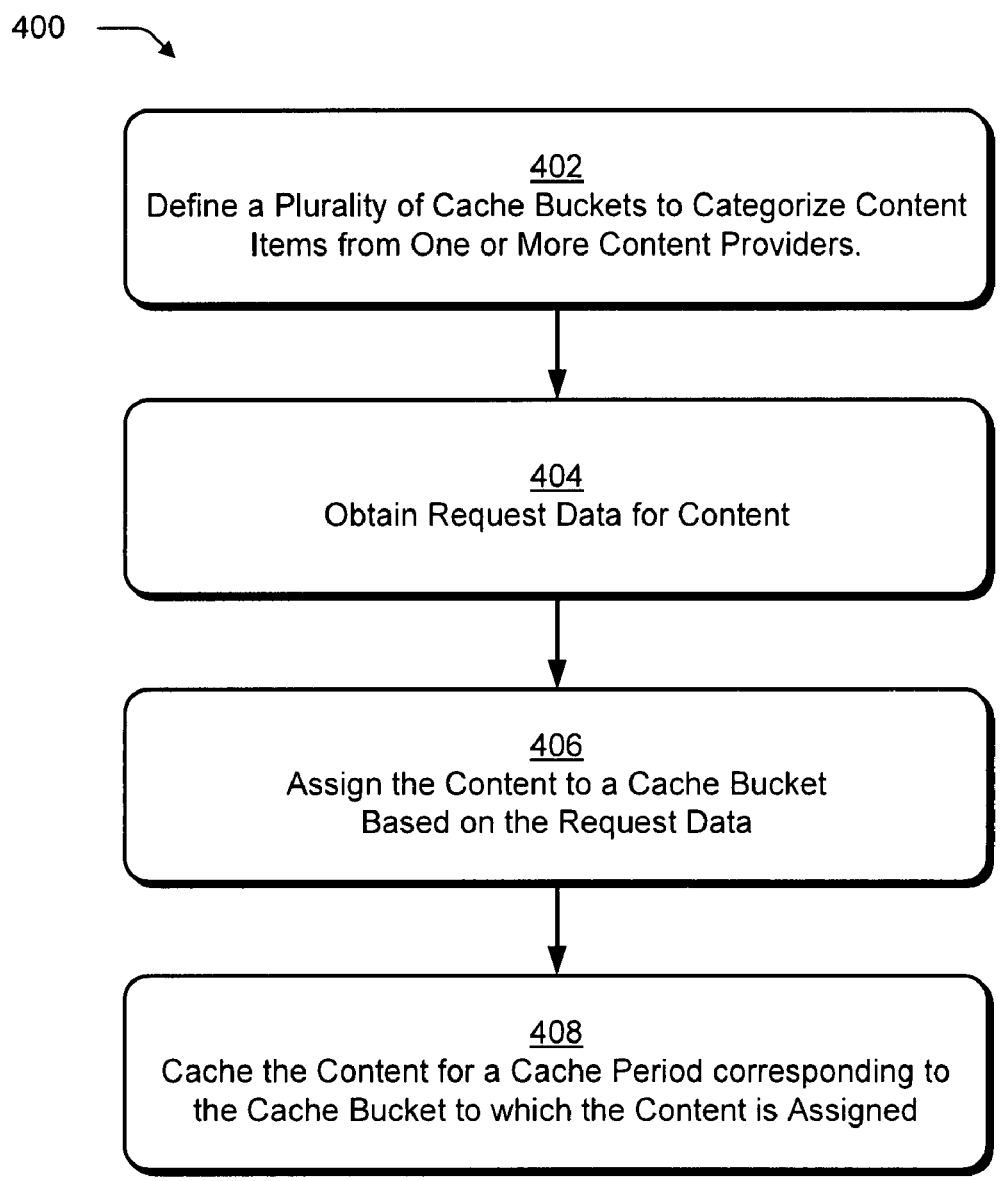
FIG. 4 is a flow diagram depicting a procedure in an exemplary implementation in which cache buckets are defined to associate content with cache periods.

FIG. 4 is a flow diagram depicting a procedure in an exemplary implementation in which cache buckets are defined to associate content with cache periods. A plurality of cache buckets is defined to categorize content from one or more content providers (block 402). For example, the head end 102 of FIGS. 1 and 2 may define a plurality of cache buckets 222(x) such as through execution of the adaptive cache module 116 or equivalent functionality. The plurality of cache buckets 222(x) may be configured in a variety of ways to define categories or divisions of content 112(k), which may be provided by a plurality of content providers 106 to clients 104 via the head end 102. In particular, the cache buckets 222(x) may include various different criteria 304(x) and cache periods 302(x) as described with respect to FIG. 3. Associations 306(x) of content 112(k) to the buckets 222(x), based on the criteria 304(x), will accordingly cause the content 112(k) to be cached for the corresponding cache period 302(x).

Request data for content is obtained (block 404). For example, the head end 102 may receive requests 124 for content 112(k) from one or more content providers 102 and obtain and/or produce associated request data 220. Request data 220 may be maintained at the head end 102 such as in memory 208. Request data 220 may be correlated to different content 112(k) and may include, but is not limited to: request times, number of requests, client identifiers, client profile data, content identifiers, content provider data, and so forth. In an implementation, adaptive cache module 116 may monitor/intercept requests 124 and produce the request data 220 from those requests 124. Adaptive cache module 116 may further maintain request data 220 in a database or other suitable storage, and may operate to update the request data 220 as additional requests 124 are received at the head end 102.

In an example, particular content 112(k) may be initially cached for a default period 310 as particular content 112(m) in the cache 120 at the head end 102. The default period 310 expires and the particular content 112(m) is flushed from the cache 120. The head end 102, and in particular the adaptive cache module 116, may then monitor requests 124 to track when the next request 124 for the particular content 112(k) is made by the clients 104. Additionally, the head end 102 may track how many requests 124 are made. In this example, a total of 2 requests have been made and, for the purpose of this example, assume the requests occur 1 hour apart. Thus, request data 220 obtained by the head end 102 for the particular content 112(k) may comprise an average request interval of 1 hour and a total of 2 requests. Naturally, as more requests 124 are made, the average request interval and a total requests will change, and the corresponding request data 220 will reflect these changes.

The content is assigned to a cache bucket based on the request data (block 406). For instance, for the particular content 112(k) of the preceding example, adaptive cache module 116 may operate to compare the request data 220 to criteria 304(x) of the defined cache buckets 222(x). When a match is made, an association 306(x) may be formed between the particular content 112(k) and the corresponding cache bucket 222(x). The adaptive cache module 116 operates to assign different content 112(k) to different buckets 222(k) having different associated cache periods 302(x). Thus, the adaptive cache module 116 may be thought of as sorting the content 112(k) into the various buckets 222(x). If no criteria 304(x) are matched, then the default period 310 may remain associated with the content 112(k).

The content is cached for a cache period corresponding to the cache bucket to which the content is assigned (block 408). Continuing with the preceding example, assume a cache bucket 222(x) is defined as having a cache period 302(x) of ten minutes and criteria 304(x) defined as an average interval between one and two hours, and less than five total requests 124. The particular content 112(k) of the above example, which has an average request interval of one hour and a total of two requests, will be assigned to this cache bucket 222(x) based on a comparison of the request data 220 to the criteria 304(x). Accordingly, the particular content 112(k) will be cached for the associated ten minute cache period 302(x). When three or more additional requests for the content 112(k) are made, then the criteria 304(x) of less than five total requests 124 will no longer be met. Accordingly, following the additional requests 124, the content 112(k) may be associated with a different cache bucket 222(x), or with the default bucket 308 when the content 112(k) does not meet criteria 304(x) of the other cache buckets 222(x). The content 112(k) will then be cached accordingly to a different corresponding cache period 302(x).

Figure 5:
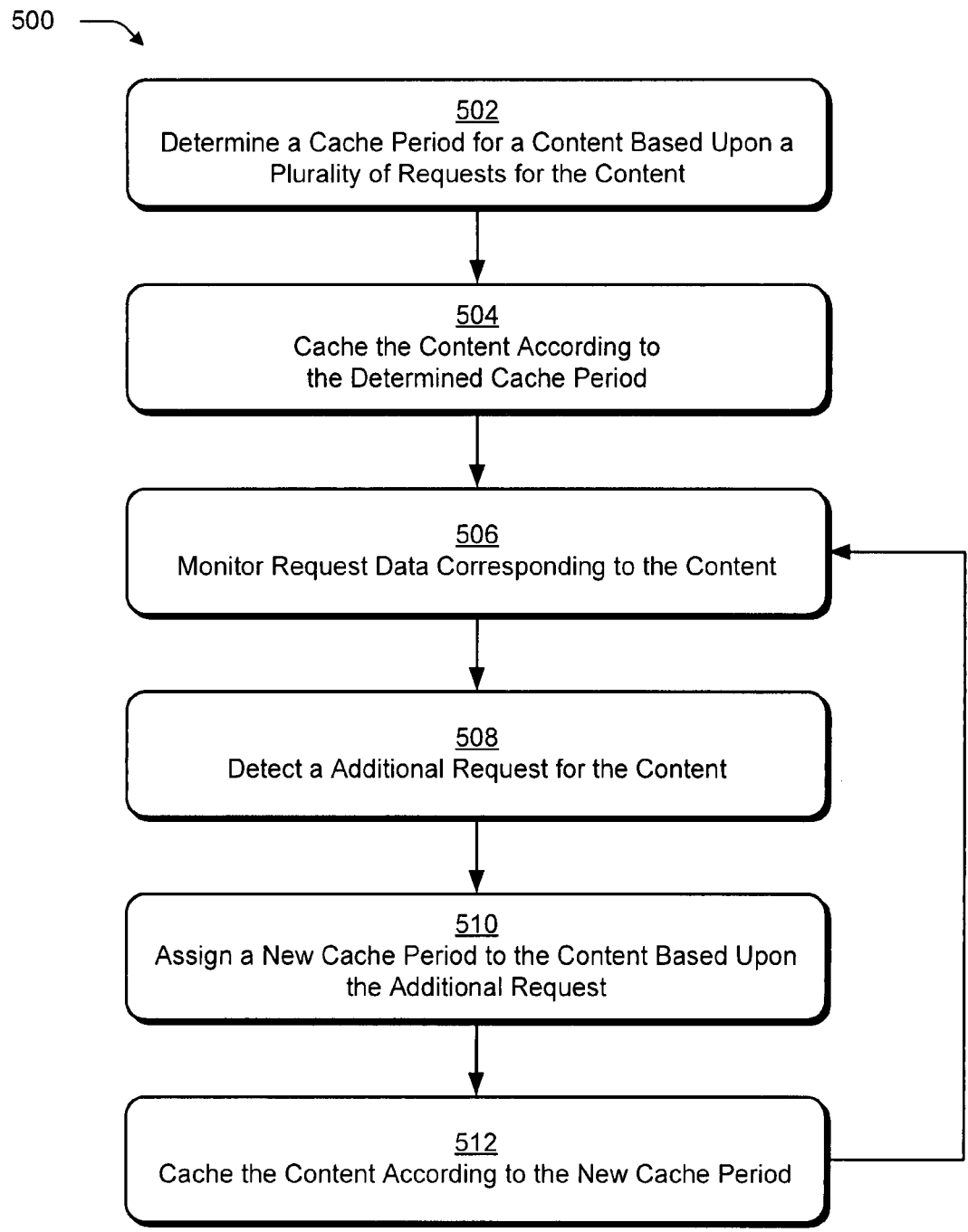
FIG. 5 is a flow diagram depicting a procedure in an exemplary implementation in which a cache period associated with content is adjusted based upon request data for the content.

FIG. 5 is a flow diagram depicting a procedure 500 in an exemplary implementation in which a cache period associated with content is adjusted based upon request data for the content. A cache period is determined for content based on a plurality of requests for the content (block 502). For instance, a gateway 118 of a head end 102 as in FIGS. 1 and 2 may be configured to provide clients 104 access to web content 112(2) via an IP network. The gateway 118 may be further configured with an adaptive cache module 116, which for the purposes of example may be a component of the gateway manager module 224 illustrated in FIG. 2. Alternatively, the adaptive cache module 116 may be a component of the head end 102 which is provided separate from the gateway 118. Adaptive cache module 116 may be configured to perform adaptive cache techniques for web content 112(2) which is provided via the gateway 118.

Thus, for content 112(k) including the web content 112(2), the adaptive cache module 116 may perform functions to define cache periods 302(x), associate the content 112(k) with a cache period 302(x) and cause the content 112(k) to be cached according to the cache period 302(x). Initially, a default period 310 may be assigned to the content 112(k), such as when little or no request data 220 for the content 112(k) has been compiled. Subsequently, the adaptive cache module 116 may obtain/process requests 124 received by the gateway 118 for web content 112(2) from the web server 218 to associate the web content 112(2) with a different cache period 302(x). Based on this processing, request data 220 may be formed and stored, for example in memory 210 of the gateway 118, or other suitable storage. The request data 220 in turn may be utilized to assign a cache period 302(x) to the web content 112(2) based on criteria 304(x) corresponding to the cache period 302(x). When, content 112(2) is to be cached, for example as content 112(m) in the cache 120 of FIG. 1, adaptive cache module 116 determines a cache period 302(x) associated with the content 112(2).

Then, the content is cached according to the determined cache period (block 504). For instance, the determined period may be a cache period 302(x) corresponding to criteria 304(x) which is met by the web content 112(2) based on comparison of request data 220 with the criteria 304(x). In an implementation, an adaptive cache module 116 is configured to compile the request data 220 and make the comparison between the request data 220 and the criteria 304(x). Alternatively, the determined period may be the default period 310. In either case, the web content 112(2) is cached for the corresponding period. While the web content 112(2) is cached, it is available to a plurality of clients 104 without additional requests 124 for the web content 112(2) from the web server 218 being made.

Request data corresponding to the content is monitored (block 506) and an additional request for the content is detected (block 508). In the previous example, the adaptive cache module 116 provided via the gateway 118 may continue to track requests 124 for the web content 112(2), as well as other content 112(k). When the determined cache period 302(x) expires, the web content 112(2) may be flushed or removed from the cache 120. Then, a client 104 seeking the web content 112(2), which is no longer cached, may make another request 124 for the web content 112(2) from the web server 218. Adaptive cache module 116 may detect the request 124 and process the request 124 to update request data 220 corresponding to the requested web content 112(2).

A new cache period is assigned to the content based on the additional request (block 510). For instance, based on processing of the additional request 124 in the above example, request data 220 will be updated to reflect new values such as a new total number of requests (e.g., an increment of a counter), a new average interval between requests, and so forth. Thus, the web content 112(2) may now meet different criteria 304(x) associated with a different cache period 302(x). Thus, a new cache period 302(x) will be assigned when the additional request 124 is processed. Then, the content is cached according to the new cache period (block 512).

The procedure 500 may then return to block 506 where the adaptive cache module 116 may continue to monitor for additional requests 124. Thus, blocks 506-512 may be repeated to assign and re-assign cache periods 302(x) to the web content 112(2) as additional requests 124 for the web content 112(2) are made and the request data 220 is correspondingly changed over time. In this manner, the caching of content 112(k), such as the web content 112(2) in the provided example, may be progressively and adaptively applied to correspond to the most recent request data 220 as long as content 112(k) is being requested. Further, the cache 120 may be optimized by adaptively changing cache periods 302(x) for content 112(k) based on the popularity of the content 112(k), e.g., how many requests 124 are made, how often the requests are made, and so on, which will be reflected by the request data 220 compiled at the head end 102.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A distribution server comprising:
   a processor; and
   memory configured to cache content requested by one or more clients from one or more content providers and maintain one or more modules that are executable on the processor to:
      obtain request data describing intervals of time between a plurality of requests by one or more clients for the content, in which the request data also describes each said request for the content by the one or more clients occurs when the content is not cached at the distribution server;
      insert an identifier into the content designating a cache period for the content based on the request data; and
      cache the content in the memory according to the designated cache period.

2. A distribution server as described in claim 1, wherein the one or more modules are further executable to:
   define a plurality of said cache periods, each having associated criteria; and
   compare the obtained request data to one or more of the associated criteria to determine the designated cache period.

3. A distribution server as described in claim 2, wherein the associated criteria specify a request time interval or a total number of requests.

4. A distribution server as described in claim 1, wherein:
   a plurality of said cache periods each have associated criteria that define a time interval;
   the request data further comprises an average time interval between the plurality of requests by the one or more clients for the content; and
   the one or more modules insert the identifier into the content designating the cache period for the content based on the request data by comparing the average time interval to one or more said time intervals of the plurality of said cache periods.

5. A distribution server as described in claim 1, wherein the content includes broadcast content that includes television programming and web content.

6. A distribution server as described in claim 1, further comprising an internet gateway to provide the content when configured as web content.

7. A method comprising:
   determining a time interval value for content based at least in part on intervals of time that occur between a plurality of requests for the content received by a distribution server from one or more clients; wherein each said request for the content is determined when the content is not cached at the distribution server;
   inserting into the content one of a plurality of identifiers based on the determined time interval value, wherein each said identifier designates a length of time; and
   storing the content in a cache according to the designated length of time of the inserted identifier.

8. A method as described in claim 7, further comprising:
   removing the content from the cache when the designated length of time expires;
   detecting a next said request for the content;
   determining a new said time interval value for the content based on the next said request; and
   inserting into the content one of the plurality of identifiers based on the new said time interval value.

9. A method as described in claim 7 further comprising:
   assigning a priority to the content based upon a total number of the plurality requests; and
   removing the content from the cache before the designated length of time expires based upon the priority.

10. A method as described in claim 7, wherein the time interval value defines an amount of time between when the content is removed from the cache and when another said request for the content is received.

11. A method as described in claim 7, wherein at least one of the plurality of identifiers includes a threshold value that defines an amount of said content into which the at least one identifier is inserted, which when exceeded causes the at least one identifier to be divided into two or more identifiers, at least one of which having a new designated length of time.

12. A method as described in claim 7, further comprising determining a total number of the plurality of requests; and wherein the inserting into the content the one of the plurality of identifiers is based on the total number of plurality of requests and the determined time interval value.

13. A method as described in claim 7, wherein each of the plurality of identifiers includes one or more criteria which define an interval of time for each said identifier that is usable to perform the inserting the identifiers into content.

14. One or more computer-readable storage media comprising instructions that are executable to:
   define a plurality of cache periods each associated with criteria that defines a total number of requests and a request interval;
   determine request intervals for content based at least in part on intervals of time between a plurality of requests for the content, wherein each said request for the content is determined when the content is not cached;
   insert an identifier into the content designating the respective cache period when the content meets the criteria associated with one of the plurality of cache periods.

15. One or more computer-readable storage media as described in claim 14, wherein:

the request interval defines an average time between the requests; and the total number of requests defines a minimum total number of requests.

16. One or more computer-readable storage media as described in claim 14, wherein the instructions further insert an identifier into the content designating a default cache period for the content when the content does not meet the criteria.

17. One or more computer-readable storage media as described in claim 14, wherein the content includes broadcast content and web content.

* * * * *

UNITED STATES PATENT AND TRADEMARK OFFICE
CERTIFICATE OF CORRECTION

PATENT NO. : 7,996,483 B2
APPLICATION NO. : 11/820885
DATED : August 9, 2011
INVENTOR(S) : Amit A. Dhodapkar It is certified that error appears in the above-identified patent and that said Letters Patent is hereby corrected as shown below:

In column 7, line 30, after "request" insert -- it --.

Signed and Sealed this
Twenty-fifth Day of October, 2011

David J. Kappos
*Director of the United States Patent and Trademark Office*